United States Patent [19]

Fontana

[11] 4,275,961
[45] Jun. 30, 1981

[54] HALFTONE PHOTOGRAPHIC METHOD AND APPARATUS

[76] Inventor: Emanuel J. Fontana, 10810 Tyrone Dr., Upper Marlboro, Md. 20870

[21] Appl. No.: 66,409

[22] Filed: Aug. 14, 1979

[51] Int. Cl.³ .................. G03B 27/72; G03B 27/32
[52] U.S. Cl. .................................... 355/71; 355/77
[58] Field of Search ................................. 355/71, 77

[56] References Cited

U.S. PATENT DOCUMENTS

| | | | |
|---|---|---|---|
| 3,249,000 | 5/1966 | Pack | 355/71 X |
| 3,335,636 | 8/1967 | Atkinson | 355/71 X |
| 3,506,350 | 4/1970 | Denner | 355/71 X |
| 3,597,077 | 8/1971 | Dorn | 355/71 |
| 4,080,055 | 3/1978 | Gary | 355/71 X |
| 4,087,180 | 5/1978 | DiNatale | 355/77 |
| 4,135,813 | 1/1979 | Frank et al. | 355/71 |

*Primary Examiner*—Richard A. Wintercorn
*Attorney, Agent, or Firm*—Bacon & Thomas

[57] ABSTRACT

A supplemental flash exposure is made of a halftone negative in a process camera for making halftones. Before making the flash exposure, a reflector card is placed on the copyboard holding the original continuous tone copy, the reflector card having a gray scale value of between about 45% and about 80% of the shadow density of the original copy. The reflector card controls the flash exposure, so that dots formed during the main exposure in the highlight and middletone areas of the original copy are not affected, but dot formation in the shadow areas is enhanced. The result is a haze free reproduction with sharp definition and contrast.

10 Claims, 3 Drawing Figures

U.S. Patent    Jun. 30, 1981    4,275,961
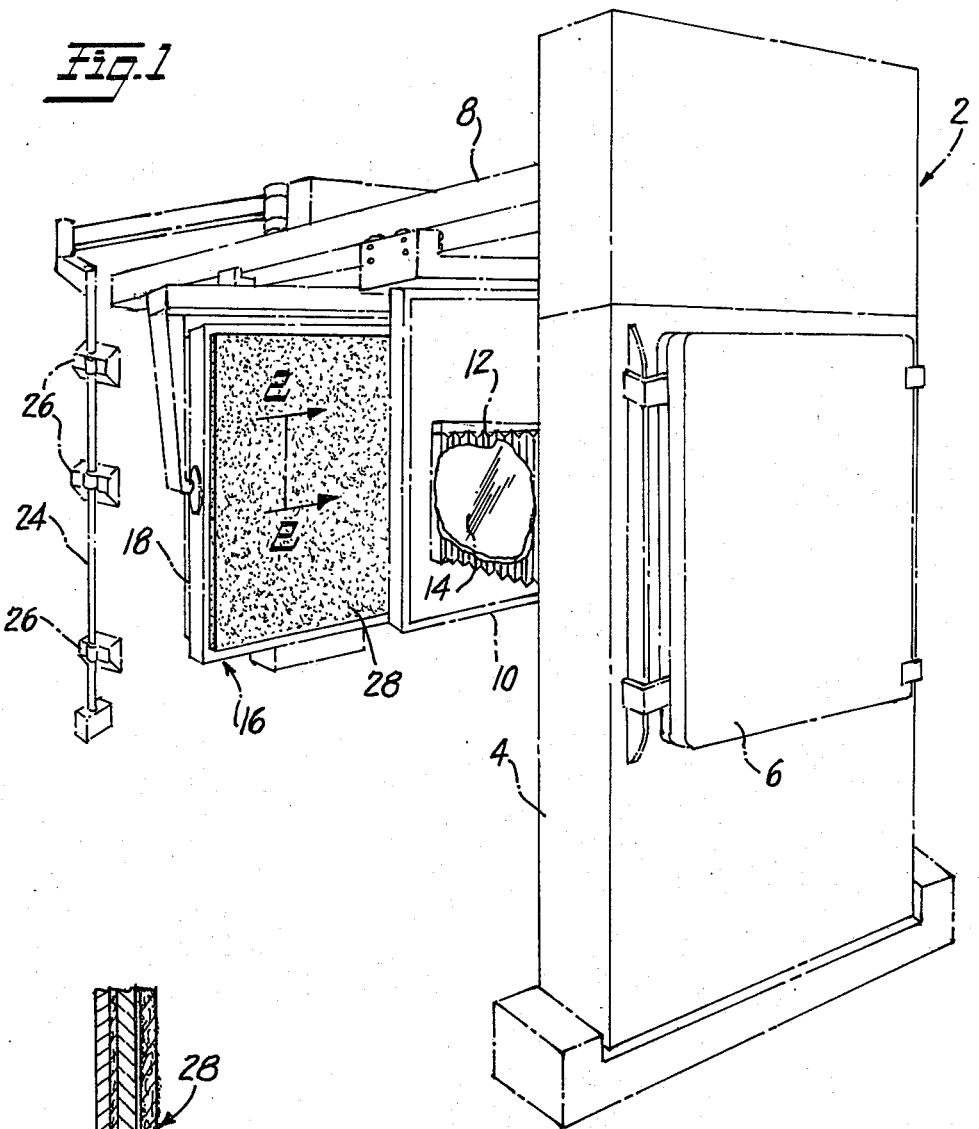
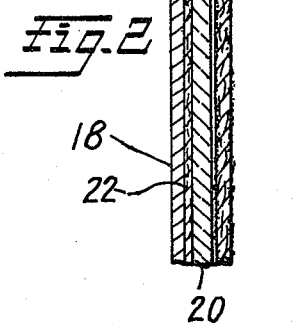
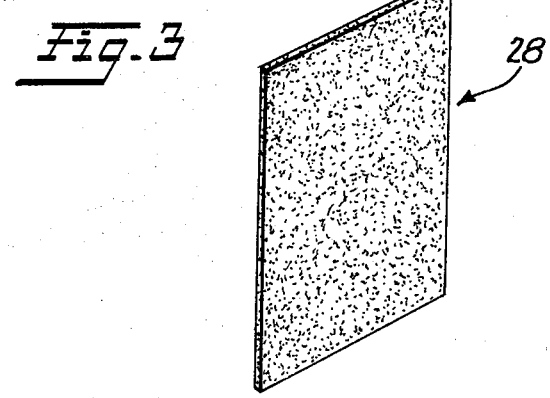

HALFTONE PHOTOGRAPHIC METHOD AND APPARATUS

TECHNICAL FIELD OF THE INVENTION

This invention relates generally to a process and apparatus for making halftones, which are used in printing to reproduce continuous tone original copy such as photographs and paintings. More specifically, it relates to an improved process and apparatus for making halftones, capable of producing superior halftones wherein the shadow and darker areas are sharply defined and the light areas are clear and bright.

BACKGROUND OF THE INVENTION

The use of halftones in printing processes to reproduce photographs, paintings and other continuous tone original copy is well known, and the art has been widely established for many years. A halftone is produced by placing a screen in contact with a negative within a camera, mounting the continuous tone original copy on a copyboard in front of the camera, and then exposing the copy through the screen. The screen is designed to break the continuous tone original copy into a great multiplicity of very small dots, which produces a negative similarly having such dots and which is then used to make a printing plate.

A typical screen will be comprises of two sheets of glass having a large number of parallel opaque lines thereon, the sheets being placed in contact with the lines on one sheet running at 90° to the lines on the other sheet, whereby a great many very small squares are formed through which reflected light can pass to reach a negative. The number of lines on a screen can vary, depending on the nature of the copy, the desires of the operator, the kind of paper to be used in the printing process, and other factors. Typically, screens will have from 45 to 400 lines per inch, although screens with from 60 to 150 lines are more commonly used. Screens are also known with circular and eliptical dots, as opposed to square, and such offer advantages in certain situations.

In making a halftone by the conventional single negative process, the continuous tone original copy is first secured to a copyboard in line with the lens of the camera, and a suitable screen is placed in the camera in contact with a negative. Then, a main exposure is made, wherein the camera lens is opened and the copyboard is lighted. Light is reflected from the original copy, through the camera lens and the screen, and onto the negative. The screen serves to break the reflected light into dots, the lightest copy areas reflecting the most light and casting the largest, most closely spaced dots on the negative, and the darker copy areas reflecting less light and forming smaller, more widely spaced dots.

When the negative is then developed and used to make a printing plate, the dot pattern on the plate is reversed. That is, the darker areas will have the greater dot intensities and thus will apply the most ink to the paper, while the highlight areas will contain the fewest dots and will apply the least ink. An ink print will contain a reproduction of the original copy, appearing as a pattern of minute dots. To the naked eye, the dot patterns on the ink print create the illusion of continuous tone. However, the dot pattern can be seen under heavy magnification.

For some continuous tone original copy, the main exposure alone will produce a satisfactory negative. However, it has been found that in most instances, the halftone resulting from the main exposure provides a less than satisfactory reproduction of the original copy, particularly when the original is a photograph containing a wide range of tones on the gray scale.

The commonly used gray scale measures tones on a value scale of from 0 to 2.00, with 0 representing white and 2.00 representing black. Between 0 and 2.00, the gray scale is normally divided into ten tones of varying intensity, commonly expressed by the density designations of 0.10, 0.20, 0.30, 0.50, 0.70, 1.00, 1.30, 1.60, 1.90 and 2.00. Devices have been developed for measuring the tone intensity of copy, commonly called densitometers, and these can provide a readout of density on the gray scale. The highlight and middletone areas will typically be in the range of from 0 to about 0.90 on the gray tone scale for an average photograph. The darker shadows will fall in the upper end of the scale between 1.60 and 2.00, with 2.00 being black.

The problem in making good halftones from continuous tone original copy containing a wide range of gray tones is as follows. If the main exposure is too long, so as to allow all of the middletone and darker areas to be reflected by dots on the negative, then the whiter highlight areas will become a mass of closely spaced large dots and will wash out when printed. On the other hand, if a short main exposure is made, there will be very few or no dots on the negative in the upper middletone and darker areas, and all definition in these portions of the copy will be lost. Thus, the typical main exposure must be a compromise, unless the original copy has a narrow range of gray tones thereon. The result is that the dot pattern in most instances is not truly satisfactory in either the highlight or the darker areas, while the middletones may be generally accurate. The quality of an ink print is thus also compromised, and it will not be a true reproduction of the original copy.

In an effort to overcome this problem, techniques known as "flashing" and "bumping" have been developed, among others. A flash is a short, supplementary nonimage exposure of the negative, made through the screen, and is intended to compensate for the lack of light reflected from the darker parts of the original copy during the main exposure. A flash is commonly done by first placing a white card over the original copy on the copyboard, and then making a short exposure of the negative with the screen in place. The result is to burn additional dots on all areas of the negative, resulting in dots where none may have previously existed in the darker areas, and the enlargement of dots made earlier during the main exposure.

In addition to using the white card technique, flashing is also sometimes done by shining a light through the camera lens for a short period, with the screen in place, or by shining an overhanging light on the screen and negative sandwich exposed on an open camera back. In the latter instance, the overhanging light is usually fitted with a yellow filter.

As has been noted, flashing provides a supplemental exposure through the screen, and affects all areas of the negative. While producing more intense dots in the middletone and shadow areas, it also produces shadow dots in the very dark areas, and enlarges the dots in the white or highlight areas. The result is to improve overall detail in the resultant print, but at the price of some deterioration in all of the gray tones, a general flattening out of the reproduction, and the creation of a general haze over the print reproduction. By adding shadow dots in the dark portions there is a resultant reduction in ink saturation in such areas, sometimes by as much as 0.40 on the gray scale; thus, blacks on the original copy may appear dark gray on the reproduction. While there is a loss of detail if the shadow dot is missing, there is an accompanying loss of contrast when the shadow dots are burned on the negative. Thus, while flasing can provide an improved print over use of only a main exposure, the resultant gray tones of the reproduction are again a compromise and do not truly reflect the original copy.

In addition to flashing, the further technique of bumping is sometimes used. A bump is a very short exposure of the continuous tone original to the negative, with the screen removed from the copy camera. The effect of a bump is to close up the tiny clear dots in the negative, or to perhaps simply drop them out. This will produce more contrast in that area, but with loss of detail.

The commonly used single negative halftone techniques, then, can provide acceptable printing plates for most instances. But the quality of the reproduction is not truly faithful to the original copy for the reasons noted. The typical reproduction print will contain shadow areas which are more poorly defined than on the original copy, and it will have a general light haze thereover.

A different technique which can produce halftones of higher quality has also been proposed, wherein a plurality of negatives are made. Each negative has a different exposure, to accurately represent one portion of the gray scale as such is contained on the original copy. The negatives are then combined to make the reproduction. While this multiple negative process produces better results than the single negative process just described, it requires multiple exposures and is expensive. Further, considerable skill is required to practice the technique, since there must be precise registration of the different negatives. Thus, the multiple negative halftone process does not fully satisfy the need for an effective halftone technique.

There is need for an improved process and apparatus for making halftones, capable of producing reproductions of original copy that are faithful in tone, well defined and haze-free, and which will not require expensive new equipment or modifications to existing equipment, or great skill to utilize. The present invention is intended to satisfy that need.

BRIEF SUMMARY OF THE INVENTION

A new single negative technique for making halftones has been discovered, utilizing a main exposure and a flash exposure. But there is a major difference in the flash exposure over all prior known approaches, resulting in the production of a truly superior halftone which is well defined in all areas and free of haze.

It has been discovered that by confining the flash exposure of the negative to tones from the middle range of the gray scale and upwardly, the washing out of the highlight area which occurs with conventional flashing can be avoided and, at the same time, good definitions can be obtained in the darker, shadow areas. To put it another way, by avoiding further exposure of the negative in the highlight and middletone areas of the copy during flashing, the problems found with the present single negative halftone technique can be largely eliminated.

A preferred manner for carrying out the invention is to utilize a novel reflector card for the flash, one which is placed over the original copy on the copyboard, and which has a gray tone selected to be denser than the highlight and middletone areas of the original. A typical value for the reflector card will be about 1.30 on the gray scale, which has been found to provide a sharply defined halftone made from a photograph, one capable of producing an ink reproduction which is very close in appearance to the original photograph itself.

The present invention produces a halftone of quality comparable or better to that obtained with a multiple negative technique, but requires only a single negative and no expensive procedures. It can be easily adapted to original copy of different densities, and can be used when working in either black-and-white or color.

The principal object of the invention is to provide an improved single negative process and apparatus for making halftones, wherein a halftone is made which will produce an ink reproduction substantially identical in gray tones and definition to the original continuous tone copy.

Another object is to provide an improved halftone process and apparatus which is simple and economical to use, and which is readily adaptable to existing equipment for making halftones.

Other objects and many of the attendant advantages of the invention will become readily apparent from the following description of the preferred embodiment, when taken in conjunction with the accompanying drawings.

BRIEF DESCRIPTION OF THE DRAWINGS

FIG. 1 is a perspective view of process camera apparatus for making a halftone, and shows the unique reflector card of the invention in place on the copyboard;

FIG. 2 is a partial vertical, sectional view through the copyboard, the original copy and the reflector board of the invention, taken along the line 2—2 in FIG. 1; and FIG. 3 is a perspective view of the reflector board of FIGS. 1 and 2.

DESCRIPTION OF THE PREFERRED EMBODIMENT

Referring to FIG. 1, a typical process camera for making halftones is indicated generally at 2, and includes an upright camera frame 4. The rear of the frame 4 carries a hinged negative holder 6, which opens to allow insertion and removal of a negative. The screen (not shown) for making the halftone is mounted within the frame 4, the arrangement being such that the negative will be held in direct contact with the screen when the negative holder 6 is in its closed, operative position.

A horizontal bracket 8 extends forwardly from the camera frame 4, and mounts a lens holder 10 so that it is movable toward and away from the frame 4. A bellows 12 extends between the lens holder 10 and the frame 4, and a camera lens 14 is carried by the holder. A copy holder 16 is mounted on the bracket 8 outwardly of the lens holder 10, and includes a copyboard 18 having a glass cover sheet 20. The cover sheet 20 can be opened for placement of a continuous tone original copy 22 on the copyboard 18, the original then being clamped in position between the copyboard and the closed cover sheet. Light brackets 24 are suspended from the horizontal bracket 8, and carry exposure lights 26 which are activated by a switch to illuminate the copyboard. The process camera apparatus as just described is commercially available, and will not be further described herein.

A halftone is made with the process camera 2 by first mounting the original copy 22 in place on the copyboard 18, and placing a negative in the negative holder 6. A suitable screen (not shown) is mounted in the camera frame 4, to be in contact with the negative when the holder 6 is closed. The lens 14 is then set, and the main exposure is made. A typical main exposure can be for about 16 seconds, at a lens setting of f22. This will result in the placement of a pattern of dots on the negative, related to the whole range of gray tones found on the continuous tone original 22. To this point, the single negative process of the present invention parallels what is known in the art.

After the main exposure, a reflector board 28 is placed on the copy holder 16 to lie on the glass cover sheet 20. Whereas flash boards in the past have been white and have had a gray scale value of at or very near 0.0, the reflector board 28 is sharply different. The reflector board 28 has a gray scale density placing it between the upper end of the highlight and middletone density of the original copy 22, and below the dark and black portion of the gray scale. Typically, the reflector board 28 will have a gray scale density of about 1.30. The dimensions of the reflector board 28 should be adequate so that all of the original copy 22 is covered, and preferably all of the copyboard 18; no stray reflective areas should be left uncovered by the board 28.

With the reflector board 28 in place, a flash secondary or supplemental exposure is made by illuminating the board and opening the camera lens. When this is done, light having a density range like that of the reflector board is reflected through the camera lens and the screen, to fall on the negative. This will cause dots in the shadow areas of the original copy to be burned onto the negative. But since substantially no light is reflected in the highlight and middletone areas, these dots on the negative are not adversely affected. Further, the production of shadow dots in the dark areas is minimal, with the result that heavier blacks are obtained over what is possible with conventional flashing.

The supplemental exposure will usually be much shorter than the main exposure. Again assuming an f setting of about 22 for the lens, a typical supplemental exposure time might be five seconds, where the main exposure was about 16 seconds.

When the flash exposure is completed, the negative is removed from the process camera 2 and developed. No "bumping" is required, and indeed such would damage the quality of the halftone. Because the dots in the highlight and middletone areas of the negative were not added to by using the reflector card 28 for the flash, they will retain their sharp configurations as obtained during the main exposure and the haze usually found on halftones is eliminated. The light to deep shadow areas have had their dots enhanced, which brings out the fine detail found on the original. Finally, by stopping the flash exposure to the shadows short of about 1.80 on the gray scale, shadow dots are not placed in these areas. Thus, ink saturation in the press is increased and the dark and black areas will receive a solid printing of black ink, providing more contrast in the reproduction while maintaining all the light to deep shadow detail. The result is a reproduction of very high quality.

The actual density used on the reflector card can be varied, depending largely on the density range of the original continuous tone copy. As has been noted, the highlights and middletones of an average photograph having a density range of from 0 to 2.00 on the gray scale will fall in the area of from 0 to 0.90. The density on the gray scale of the reflector card should be at or above the upper end of this highlight and middletone range, or at or above a density of 0.90. Further, the density of the reflector card 28 should not go above 1.60 on the gray scale. For the average photograph, then, the range for the reflector card is from 0.90 to 1.60 on the gray scale and, in most instances, a value of about 1.30 will provide satisfactory results.

To state the range in a more general way, it has been found that the gray scale value for the reflector card 28 should fall between about 45% and about 80% of the shadow density of the original copy. The precise value on the gray scale for the reflector card 28 can be varied, depending upon whether the average shadow density of the original copy is higher or lower than about 1.30. Such density can be measured by using a densitometer, in the usual manner.

While the invention is especially adapted to black-and-white usage, it can also be employed with color reproduction, such as the conventional four color process for reproducing color photographs and paintings. Again, when making each of the negatives required for color reproducton, the reflector card 28 is employed for flashing, and no further exposures of the negatives occur in the highlight and middletone areas. At the same time, detail in the shadow areas will be greater than has heretofore been possible, and the resultant color print will possess a brilliance very like that of the original copy.

Obviously, modifications and variations of the invention are possible.

I claim:

1. In the method for making a halftone from a continuous tone original copy utilizing a process camera means in which are mounted a suitable screen and a negative, said process camera means including a copyboard upon which the original copy is mounted, the method steps of:
   making a main exposure of said negative by illuminating the original copy and opening the lens of said process camera for a first selected period of time;
   placing a reflector board over said original copy, said reflector board having a gray scale value greater than the gray scale value of the highlight and at least the lower middletone areas of the original copy;
   making a supplemental exposure of said negative, by illuminating the reflector board and opening the lens of said process camera for a second selected period of time; and
   developing said exposed negative.

2. In the method as recited in claim 1, wherein the gray scale value of said reflector card lies above the gray scale value of both the highlights and the middletones of said original copy.

3. In the method as recited in claim 1, wherein the gray scale value of said reflector card lies in a range of between about 45% to about 80% of the shadow density of the original copy.

4. In the method as recited in claim 3, wherein the gray scale value of said reflector card lies at about the midpoint of said range.

5. In the method as recited in claim 1, wherein said original copy has gray tones extending over a gray tone scale of from about 0 to about 2.00, the highlight and middletones of said original copy extending from about 0 to about 0.90 on said gray tone scale, and wherein the gray scale value of said reflector card lies in a range of between 0.90 and 1.60 on said gray tone scale.

6. In the method as recited in claim 5, wherein the value of said reflector card is about 1.30 on said gray tone scale.

7. In apparatus for making a halftone from a continuous tone original copy, said apparatus including a process camera means for mounting a suitable screen and a negative, and a copyboard means adapted for mounting said original copy thereon:
   a reflector card for use in making a supplemental flash exposure of said original copy; said reflector card being adapted for mounting on said copyboard means, and having a gray scale value which lies in a range of between about 45% to about 80% of the shadow density of the original copy.

8. In apparatus for making a halftone as recited in claim 7, wherein said reflector card has an area sufficient to at least cover said original copy, when both are in place on said copyboard.

9. In apparatus for making a halftone as recited in claim 7, wherein said reflector card has a gray scale value of between 0.90 and 1.60. on a gray scale extending from 0 to 2.00.

10. In apparatus for making a halftone as recited in claim 9, wherein said reflector card has a value of about 1.30 on said gray scale.

* * * * *